US012713229B2

(12) United States Patent
Chen et al.

(10) Patent No.: US 12,713,229 B2
(45) Date of Patent: Aug. 18, 2026

(54) CAPABILITY REPORTING METHOD AND MODEM CHIP PERFORMING THE SAME

(71) Applicant: MEDIATEK Inc., Hsinchu City (TW)

(72) Inventors: Lung-Wen Chen, Hsinchu City (TW); Tsung-Ming Lee, Hsinchu City (TW)

(73) Assignee: MEDIATEK INC., Hsinchu City (TW)

( * ) Notice: Subject to any disclaimer, the term of this patent is extended or adjusted under 35 U.S.C. 154(b) by 414 days.

(21) Appl. No.: 18/492,854

(22) Filed: Oct. 24, 2023

(65) Prior Publication Data

US 2024/0147220 A1 May 2, 2024

Related U.S. Application Data

(60) Provisional application No. 63/420,100, filed on Oct. 28, 2022.

(51) Int. Cl.
*H04W 4/00* (2018.01)
*H04W 8/22* (2009.01)

(52) U.S. Cl.
CPC .................................... *H04W 8/22* (2013.01)

(58) Field of Classification Search
CPC ..... H04W 8/005; H04W 48/20; H04W 92/18; H04W 8/00
USPC .......................................................... 370/329
See application file for complete search history.

(56) References Cited

U.S. PATENT DOCUMENTS 10,567,051 B2 * 2/2020 Yang .................... H04B 7/0404
10,749,584 B2 * 8/2020 Rahman ............... H04B 7/0486
11,886,991 B2 * 1/2024 Wang ....................... G06N 3/02
12,120,774 B2 * 10/2024 Tomala .................. G06N 20/00
2014/0295847 A1 * 10/2014 Futaki .............. H04W 36/0058 455/436
2016/0007350 A1 * 1/2016 Xiong .................. H04W 24/10 370/252
2018/0098255 A1 * 4/2018 Murugan .......... H04W 36/0066
2018/0183503 A1 * 6/2018 Rahman ............... H04B 7/0645
2019/0132893 A1 * 5/2019 Lu ....................... H04L 41/0806
2020/0092879 A1 * 3/2020 Wu ....................... H04W 8/005
2023/0199478 A1 * 6/2023 Yang ...................... H04W 8/22 370/328

(Continued)

FOREIGN PATENT DOCUMENTS

EP 3446521 B1 * 9/2021 ........... H04W 72/51
WO WO-2018016853 A1 * 1/2018 ........... H04W 72/51

*Primary Examiner* — Marceau Milord
(74) *Attorney, Agent, or Firm* — McClure, Qualey & Rodack, LLP

(57) ABSTRACT

A capability reporting method and a modem chip performing the same are provided. The capability reporting method includes the following steps. A capability enquiry message is received from a network. A plurality of weightings for a serving Radio Access Technology (RAT) and at least one non-serving RAT are determined. The weighting for the at least one non-serving RAT is downgraded. A plurality of capability information for the serving RAT and the non-serving RAT are composed according to the weightings. The size of the capability information for the at least one non-serving RAT is reduced. The capability information for the serving RAT and the capability information for the at least one non-serving RAT are combined to obtain a capability report message. The capability report message is replied to the network.

17 Claims, 6 Drawing Sheets

(56) References Cited

U.S. PATENT DOCUMENTS

| | | | | |
|---|---|---|---|---|
| 2023/0232213 | A1* | 7/2023 | Hong | H04W 8/24<br>370/329 |
| 2023/0388768 | A1* | 11/2023 | Xhafa | H04L 67/56 |
| 2024/0064786 | A1* | 2/2024 | Jin | H04W 76/15 |
| 2024/0080656 | A1* | 3/2024 | Ma | H04W 8/24 |

* cited by examiner

CAPABILITY REPORTING METHOD AND MODEM CHIP PERFORMING THE SAME

This application claims the benefit of U.S. provisional application Ser. No. 63/420,100, filed Oct. 28, 2022, the disclosure of which is incorporated by reference herein in its entirety.

TECHNICAL FIELD

The disclosure relates in general to an operation method and an electronic component performing the same, and more particularly to a capability reporting method and a modem chip performing the same.

BACKGROUND

In order to configure a communication device (or a User Equipment) with applicable settings, the network first has to know the capability of the communication device since capability is different among communication devices.

For the communication device, which is in RRC Connected mode, the network may initiate "capability transfer" procedure specified in TS36.331 chapter 5.6.3 (for the communication device which stays at Long-Term Evolution (LTE) or TS38.331 chapter 5.6.1 (for the communication device which stays at New Radio (NR).

There's Service Data Unit (SDU) limitation at both LTE and NR. Referring to TS36.323 chapter 4.3.1 and TS38.323 chapter 4.3.1, the SDU maximum supported size will be the limitation of capability size.

If both of the network and the communication device support Radio Capability Signaling Optimization (RACS), the maximum size will be 16 times greater. For the LTE, the maximum size will be 8188*16 bytes; for the NR, the maximum size will be 9000*16 bytes.

Since the communication device supports a lot of operation bands and a lot of band combinations, the maximum size of the SDU (8188 bytes for the LTE, and 9000 bytes for the NR) is insufficient for the communication device to pack all supported band combinations.

Above limitation results in that the communication device may not be able to be configured with corresponding MRDC (including ENDC, NEDC, NNDC, etc.) or CA service and it causes poor user experience.

SUMMARY

The disclosure is directed to a capability reporting method and a modem chip performing the same. A distribution of a capability report message is dynamically changed based on which one of the Radio Access Technologies (RATs) is the serving RAT. More band combinations for the serving RAT are able to be reported and therefore the network could successfully configure such service to the communication device.

According to one embodiment, a capability reporting method for a wireless communication device is provided. The capability reporting method includes the following steps. A capability enquiry message is received from a network. A plurality of weightings for a serving Radio Access Technology (RAT) and at least one non-serving RAT are determined. The weighting for the at least one non-serving RAT is downgraded. A plurality of capability information for the serving RAT and the non-serving RAT are composed according to the weightings. The size of the capability information for the at least one non-serving RAT is reduced. The capability information for the serving RAT and the capability information for the at least one non-serving RAT are combined to obtain a capability report message. The capability report message is replied to the network.

According to another embodiment, a capability reporting method for a wireless communication device is provided. The capability reporting method includes the following steps. A capability enquiry message is received from a network. A capability report message with dynamic distribution for a serving Radio Access Technology (RAT) and at least one non-serving RAT is replied to the network.

According to an alternative embodiment, a modem chip in a wireless communication device is provided. The modem chip is configured to execute a capability reporting method. The capability reporting method includes the following steps. A capability enquiry message is received from a network. A capability report message with dynamic distribution for a serving Radio Access Technology (RAT) and a non-serving RAT is replied to the network.

Figures 1, 2:
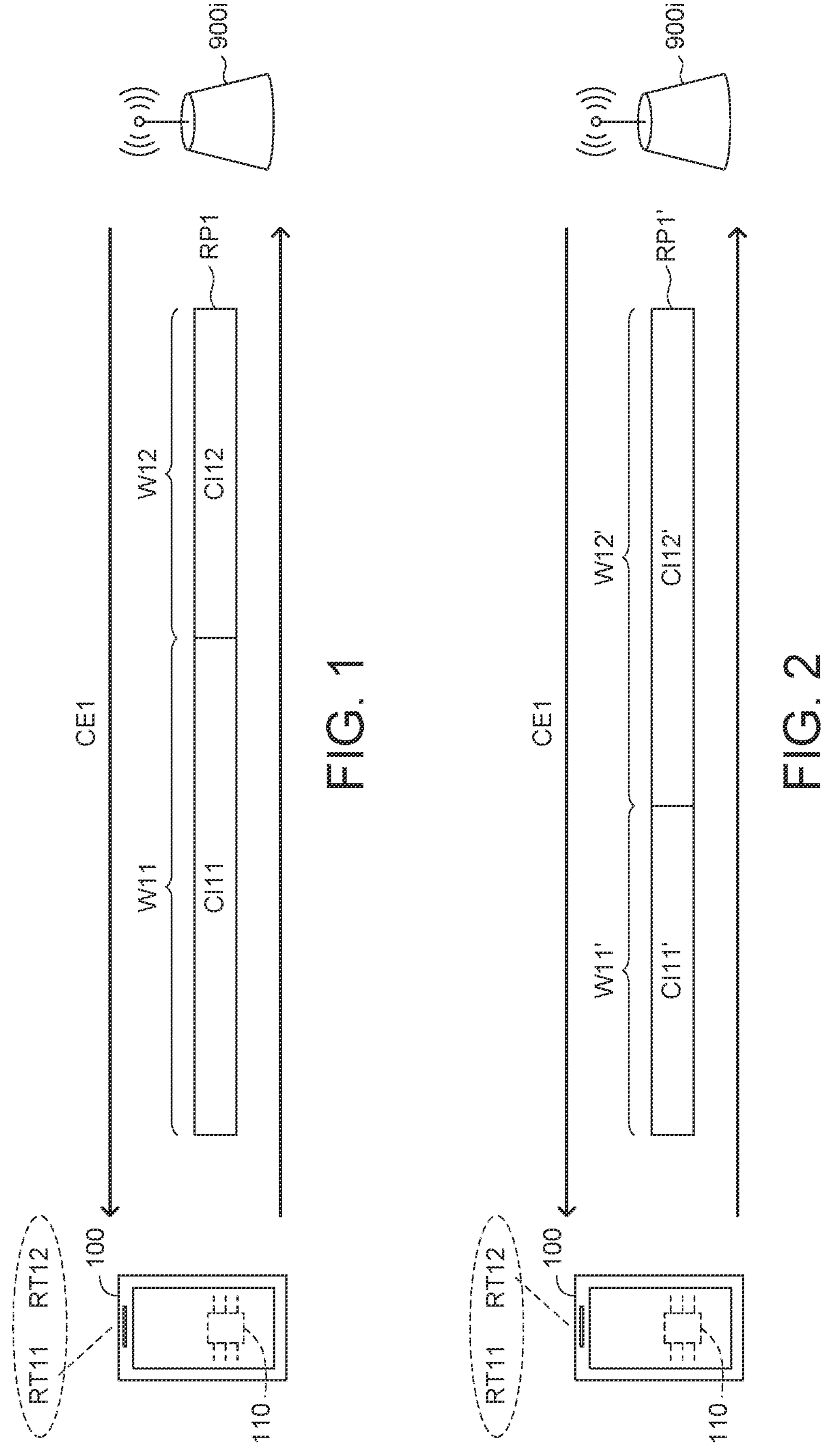
FIG. 1 shows a capability report message according to one embodiment.
FIG. 2 shows a capability report message according to another embodiment.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

The terms “comprise,” “comprising,” “include,” “including,” “has,” “having,” etc. used in this specification are open-ended and mean “comprises but not limited.” The terms used in this specification generally have their ordinary meanings in the art and in the specific context where each term is used. The use of examples in this specification, including examples of any terms discussed herein, is illustrative only, and in no way limits the scope and meaning of the disclosure or of any exemplified term. Likewise, the present disclosure is not limited to various embodiments given in this specification.

Please refer to FIG. 1, which shows a capability report message RP1 according to one embodiment. In one embodiment, a network 900*i* transmits a capability enquiry message CE1 to a communication device 100 to enquiry the communication device 100 to report the capability report message RP1 for multiple Radio Access Technologies (RATs) in single query. The communication device 100 is, for example, a smart phone, a pad, a smart watch or a laptop. The network 900*i* is, for example, a Long-Term Evolution (LTE) network or a New Radio (NR) network. For example, as shown in the FIG. 1, the capabilities of a RAT RT11 and a RAT RT12 are queried. Since size of the Service Data Unit (SDU) must be shared among all the queried RATs RT11, RT12, the communication device 100 must limit the size of the capability information CI11, CI12 for the RATs RT11, RT12 in order to pack them into a single SDU. For example, a plurality of weightings W11, W12 for the RATs RT11, RT12 are determined, and some band combinations would be reduced or downgraded.

As shown in the FIG. 1, the RAT RT11 is the serving RAT and the RAT RT12 is the non-serving RAT. In the capability report message RP1, the weighting W11 is larger than the weighting W12. Therefore, the size of the capability information CI11 for the RAT RT11 which is the serving RAT is larger than the size of the capability information CI12 for the RAT RT12 which is the non-serving RAT. Only partial of the band combinations for the RAT RT12, which is the non-serving RAT, are recorded in the capability report message RP1. That is to say, the capability information CI11 for the RAT RT11, which is the serving RAT, occupies major size of the capability report message RP1.

Please refer to FIG. 2, which shows a capability report message RP1' according to another embodiment. When the serving RAT is changed from the RAT RT11 to the RAT RT12, the distribution for the RAT RT11 and the RAT RT12 in the capability report message RP1' is dynamically changed. For example, as shown in the FIG. 2, in the capability report message RP1', the weighting W11' is less than the weighting W12'. The size of the capability information CI11' for the RAT RT11 which is the non-serving RAT is less than the size of the capability information CI12' for the RAT RT12 which is the serving RAT. Only partial of the band combinations for the RAT RT11, which is the non-serving RAT, are recorded in the capability report message RP1'. That is to say, the capability information CI12' for the RAT RT12, which is the serving RAT, occupies major size of the capability report message RP1'.

For the serving RAT, more band combinations for the serving RAT are able to be reported and therefore the network 900*i* could successfully configure such service to the communication device 100.

Figure 3:
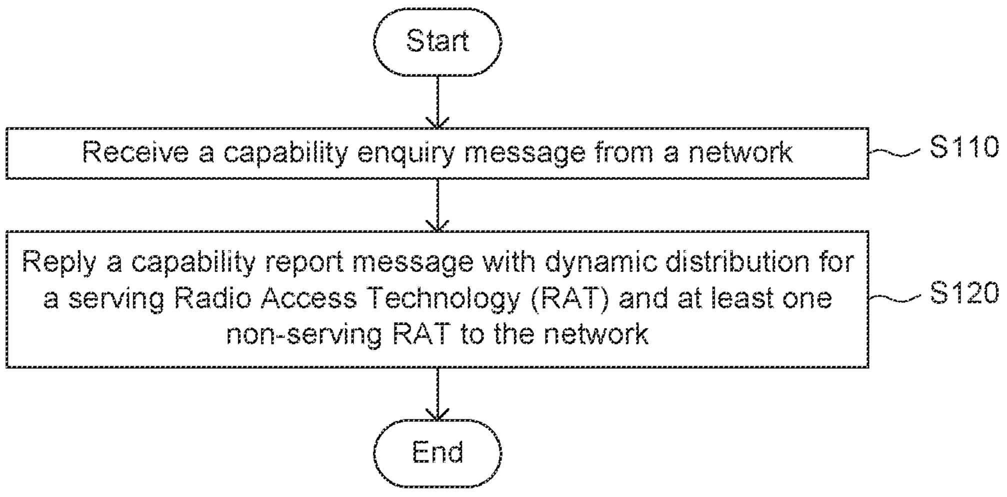
FIG. 3 shows a capability reporting method according to one embodiment.

Please refer to FIG. 3, which shows a capability reporting method according to one embodiment. As shown in the FIGS. 1 and 2, the capability reporting method could be executed by a modem chip 110 of the communication device 100. The capability reporting method includes steps S110 to S120. In the step S110 of the FIG. 3, as shown in the FIGS. 1 and 2, the communication device 100 receives the capability enquiry message CE1 from the network 900*i*.

Then, in the step S120 of the FIG. 3, as shown in the FIGS. 1 and 2, the communication device 100 replies the capability report message RP1 (or the capability report message RP1') with dynamic distribution for the serving Radio Access Technology (RAT) and the non-serving RAT to the network 900*i*. For example, as shown in the FIG. 1, the communication device 100 replies the capability report message RP1 with a first distribution shown as the FIG. 1 for the RAT RT11, which is the serving RAT, and the RAT RT12, which is the non-serving RAT, to the network 900*i*. For another example, as shown in the FIG. 2, the communication device 100 replies the capability report message RP1' with a second distribution shown as the FIG. 2 for the RAT RT11, which is the non-serving RAT, and the RAT RT12, which is the serving RAT, to the network 900*i*. The first distribution and the second distribution could be dynamically switched based on which one of the RAT RT11 and the RAT RT12 is the serving RAT.

In another embodiment, the network 900*i* may requires the communication device 100 to report the capabilities of more than two RATs. Please refer to FIG. 4, which shows a capability report message RP2 according to another embodiment. In this embodiment, the network 900*i* transmits a capability enquiry message CE2 to the communication device 100 to enquiry the communication device 100 to report the capability report message RP2 for more than two RATs in single query. For example, as shown in the FIG. 4, the capabilities of a RAT RT21, a RAT RT22 and a RAT RT23 are queried. Since size of the Service Data Unit (SDU) must be shared among all the queried RATs RT21, RT22, RT23, the communication device 100 must limit the size of the capability information CI21, CI22, CI23 for the RATs RT21, RT22, RT23 in order to pack them into a single SDU. For example, a plurality of weightings W21, W12, W23 for the RATs RT21, RT22, RT23 are determined, and some band combinations would be reduced or downgraded.

Figures 4, 5:
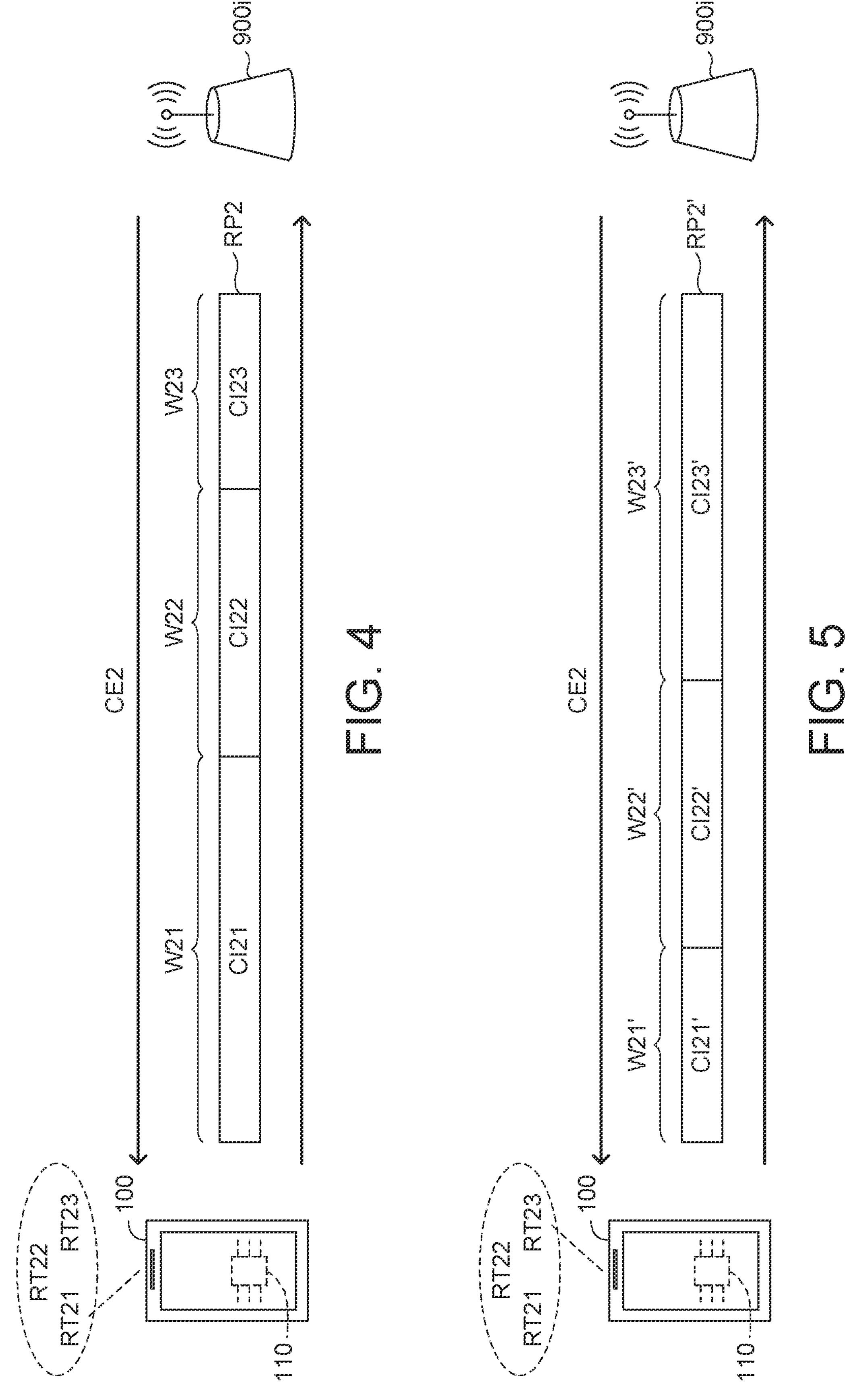
FIG. 4 shows a capability report message according to another embodiment.
FIG. 5 shows a capability report message according to another embodiment.

As shown in the FIG. 4, the RAT RT21 is the serving RAT and the RATs RT22, RT23 are the non-serving RATs. In the capability report message RP2, the weighting W21 is larger than each of the weightings W22, W23. Therefore, the size of the capability information CI21 for the RAT RT21, which is the serving RAT, is larger than the size of each of the capability information CI22, CI23 for the RATs RT22, RT23 which are the non-serving RAT. Only partial of the band combinations for the RAT RT23, which is the non-serving RAT, are recorded in the capability report message RP2. That is to say, the capability information CI21 for the RAT RT21, which is the serving RAT, occupies major size of the capability report message RP2.

Please refer to FIG. 5, which shows a capability report message RP2' according to another embodiment. When the serving RAT is changed from the RAT RT21 to the RAT RT23, the distribution for the RAT RT21, the RAT RT22 and the RAT RT23 is dynamically changed. For example, as shown in the FIG. 4, in the capability report message RP2', the weighting W23' is larger than each of the weightings W22', W23'. The size of the capability information CI23' for the RAT RT23 which is the serving RAT is larger than the size of each of the capability information CI21', CI22' for the RATs RT21, RT22 which are the non-serving RATs. Only partial of the band combinations for the RAT RT21, which is the non-serving RAT, are recorded in the capability report message RP2'. That is to say, the capability information CI23' for the RAT RT23, which is the serving RAT, occupies major size of the capability report message RP2'.

For the serving RAT, more band combinations for the serving RAT are able to be reported and therefore the network 900*i* could successfully configure such service to the communication device 100.

Figure 6A:
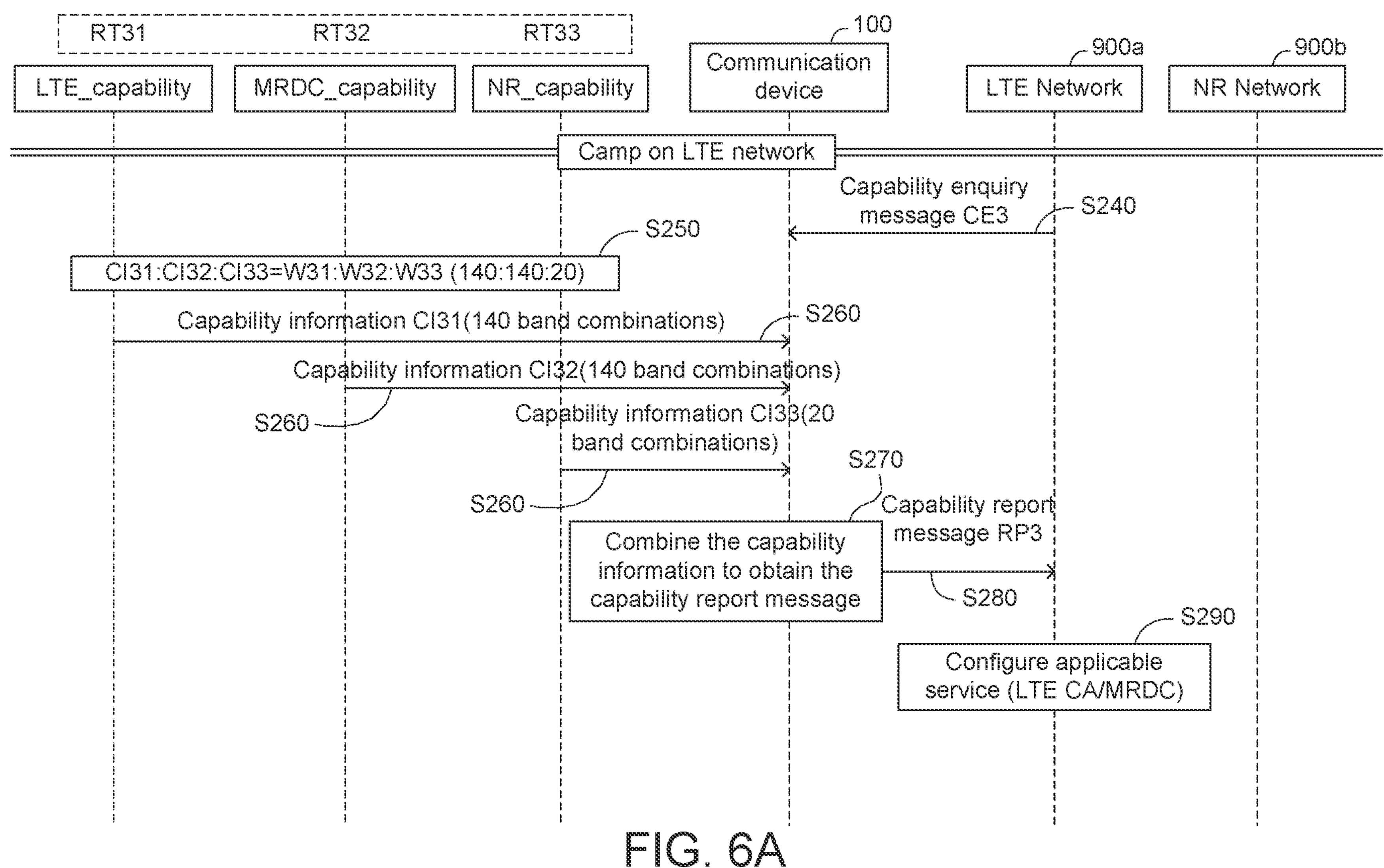
FIGS. 6A to 6B illustrate a capability reporting method according to another embodiment.
Figure 6B:
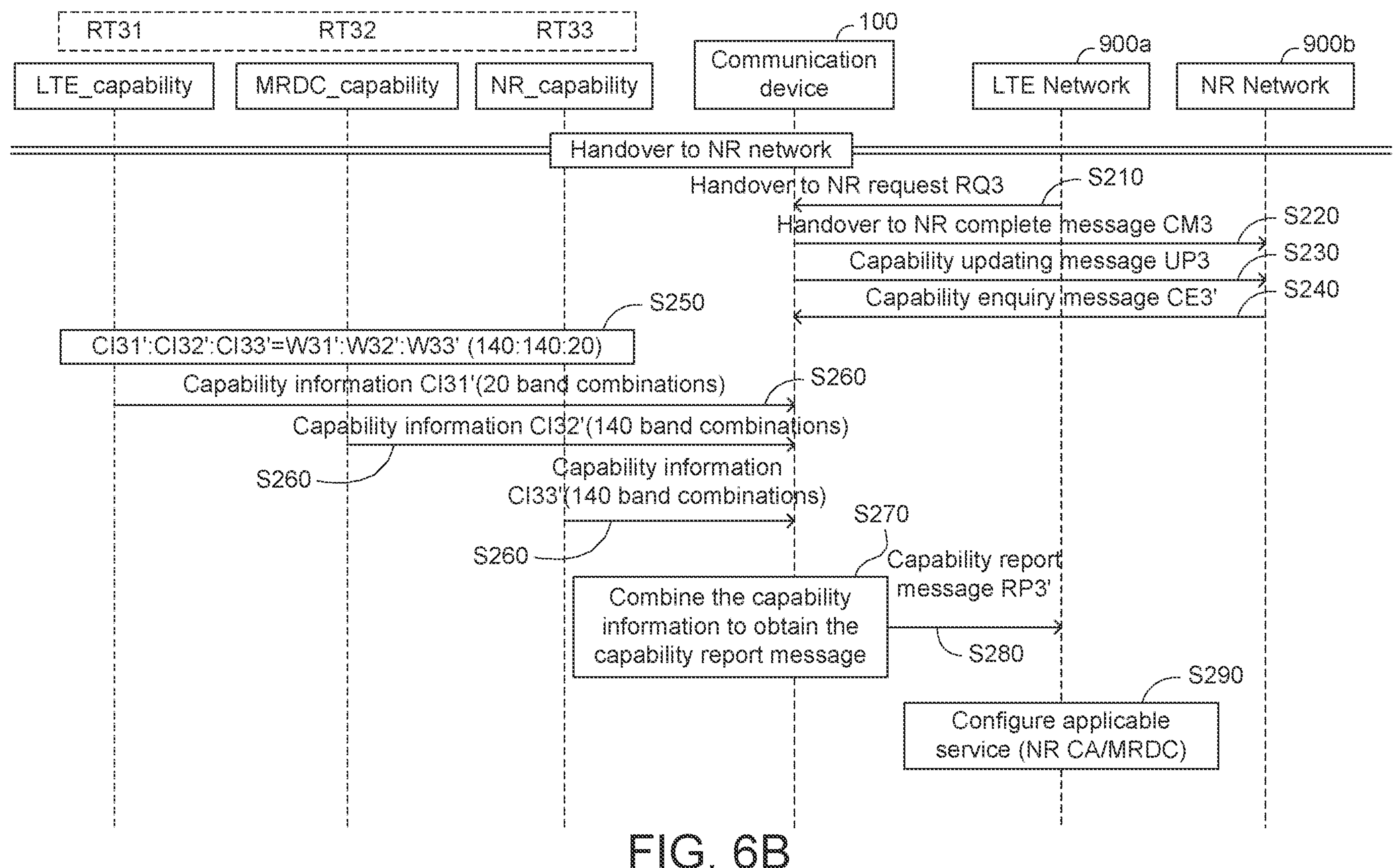

Please refer to FIGS. 6A to 6B, which illustrate a capability reporting method according to another embodiment. The capability reporting method could be executed by the modem chip 110 of the communication device 100. The capability reporting method includes steps S210 to S290. At first, as shown in the FIG. 6A, when the communication device 100 is camped on the LTE network 900*a*, the process proceeds to the step S240 to S290 of the FIG. 6A. A LTE RAT RT31 is the serving RAT, the LTE RAT RT31 and a multiple RAT dual connectivity (MRDC) RAT RT32 are the favor RATs for the communication device 100, and a NR RAT RT33 is the non-serving RAT.

In the step S240 of the FIG. 6A, the communication device 100 receives the capability enquiry message CE3 from a LTE network 900*a*.

Then, in the step S250 of the FIG. 6A, the communication device 100 determines a plurality of weightings W31, W32, W33 for the LTE RAT RT31, the MRDC RAT RT32 and the NR RAT RT33. Because the communication device 100 is camped on the LTE network 900*a*, the weighting W33 for the NR RAT RT33, which is the non-serving RAT, is downgraded. For example, the weightings W31, W32, W33 are, for example "140, 140, 20, instead of "100, 100, 100."

Next, in the step S260 of the FIG. 6A, the communication device 100 composes a plurality of capability information CI31, CI32, CI33 for the LTE RAT RT31, the MRDC RAT RT32 and the NR RAT RT33, according to the weightings W31, W32, W33. In this embodiment, the size of the capability information CI33 for the NR RAT RT33, which is the non-serving RAT, is reduced.

Then, in the step S270 of the FIG. 6A, the communication device 100 combines the capability information CI31, CI32, CI33 to obtain a capability report message RP3.

Next, in the step S280 of the FIG. 6A, the communication device 100 replies the capability report message RP3 to the LTE network 900*a*.

Afterwards, in the step S290 of the FIG. 6A, the LTE network 900*a* configures applicable LTE CA service or MRDC service to the communication device 100. Because more band combinations for the favored RATs, i.e., the LTE RAT RT31 and the MRDC RAT RT32, are able to be reported and therefore the LTE network 900*a* could successfully configure such service to the communication device 100.

Next, when a handover to the NR network 900*b* is executed, the process proceeds to the step S210 to S290 of the FIG. 6B. In the step S210 of the FIG. 6B, the communication device 100 receives a handover to NR request RQ3 from the NR network 900*b*.

Then, after completing the handover, in the step S220 of the FIG. 6B, the communication device 100 transmits a handover to NR complete message CM3 to the NR network 900*b*.

Next, in the step S230 of the FIG. 6B, the communication device 100 transmits a capability updating message UP3 to the NR network 900*b* to inform the NR network 900*b* that the capability report message RP3 is needed to be updated.

Afterwards, in the step S240 of the FIG. 6B, the communication device 100 receives a capability enquiry message CE3' from the NR network 900*b*.

When the communication device 100 is camped on the NR network 900*b*, the NR RAT RT33 is the serving RAT, the NR RAT RT33 and the MRDC RAT RT32 are the favor RATs for the communication device 100, and the LTE RAT RT31 is the non-serving RAT.

Then, in the step S250 of the FIG. 6B, the communication device 100 determines a plurality of weightings W31', W32', W33' for the LTE RAT RT31, the MRDC RAT RT32 and the NR RAT RT33. Because the communication device 100 is camped on the NR network 900*b*, the weighting W31' for the LTE RAT RT31, which is the non-serving RAT, is downgraded. For example, the weightings W31', W32', W33' are, for example, "20, 140, 140", instead of "100, 100, 100."

Next, in the step S260 of the FIG. 6B, the communication device 100 composes a plurality of capability information CI31', CI32', CI33' for the LTE RAT RT31, the MRDC RAT RT32 and the NR RAT RT33, according to the weightings W31', W32', W33'. In this embodiment, the size of the capability information CI31' for the LTE RAT RT31, which is the non-serving RAT, is reduced.

Then, in the step S270 of the FIG. 6B, the communication device 100 combines the capability information CI31', CI32', CI33' to obtain a capability report message RP3'.

Next, in the step S280 of the FIG. 6B, the communication device 100 replies the capability report message RP3' to the NR network 900*b*.

Afterwards, in the step S290 of the FIG. 6B, the NR network 900*b* configures applicable NR CA service or MRDC service to the communication device 100. Because more band combinations for the favored RATs, i.e., the NR RAT RT33 and the MRDC RAT RT32, are able to be reported and therefore the NR network 900*b* could successfully configure such service to the communication device 100.

Based on above, if the serving RAT for the wireless communication device 100 is changed from LTE to NR, a size of the capability information for LTE is decreased and a size of the capability information for NR is increased. On the contrary, if the serving RAT for the wireless communication device 100 is changed from NR to LTE, a size of the capability information for LTE is increased and a size of the capability information for NR is decreased.

Figure 7:
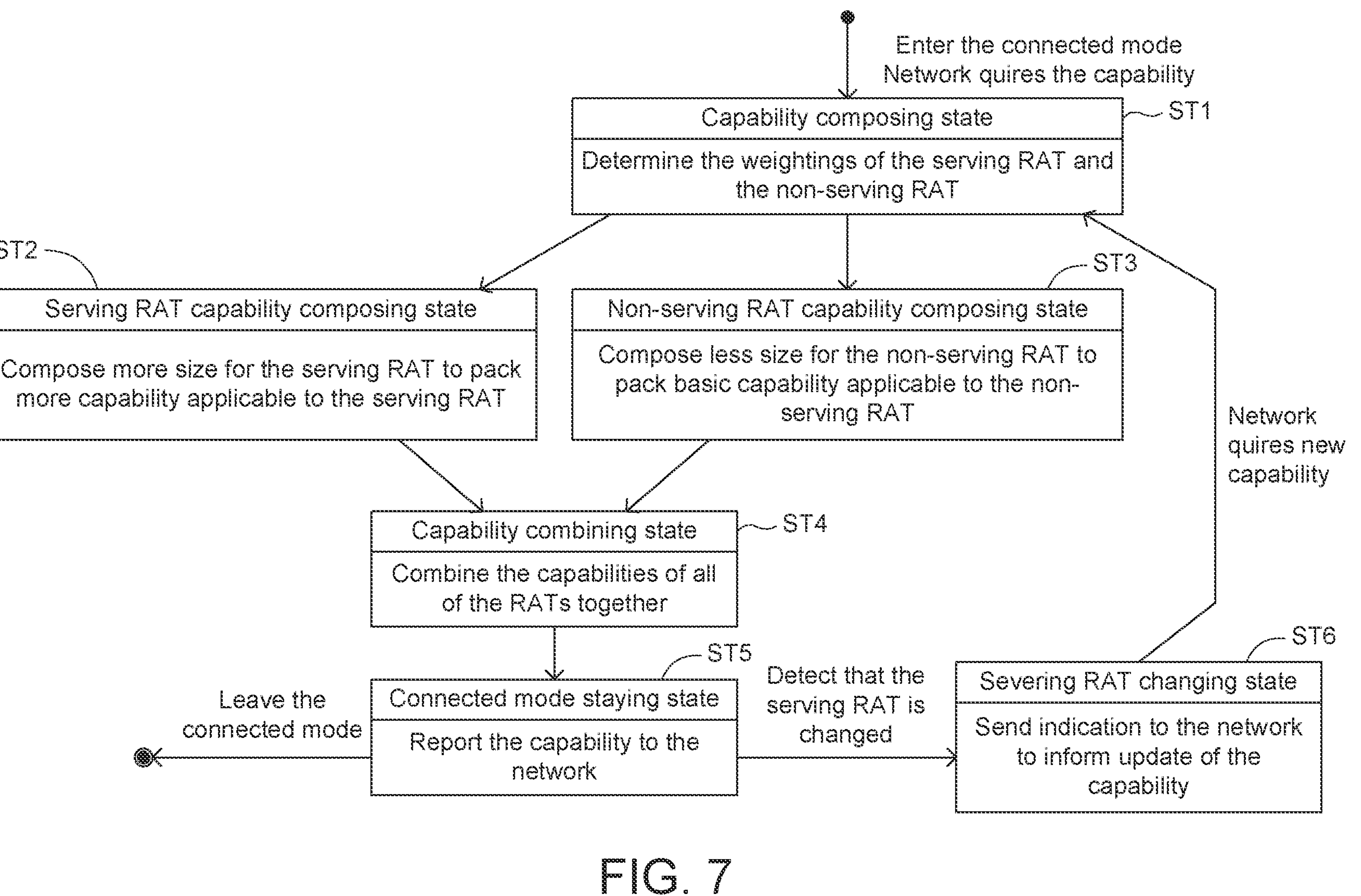
FIG. 7 shows a state machine diagram of the communication device according to one embodiment.

Please refer to FIG. 7, which shows a state machine diagram of the communication device 100 according to one embodiment. If the communication device 100 enters the connected mode and the network 900*i* quires the capability, the communication device 100 enters a capability composing state ST1.

In the capability composing state ST1, the communication device 100 determines the weightings of the serving RAT and the non-serving RAT.

Then, the communication device 100 enters a serving RAT capability composing state ST2 and a non-serving RAT capability composing state ST3.

In the serving RAT capability composing state ST2, the communication device 100 composes more size for the serving RAT to pack more capability applicable to the serving RAT.

In the non-serving RAT capability composing state ST3, the communication device 100 composes less size for the non-serving RAT to pack basic capability applicable to the non-serving RAT.

Next, the communication device 100 enters a capability combining state ST4. In the capability combining state ST4, the communication device 100 combines the capabilities of all of the RATs together.

Then, the communication device 100 enters a connected mode staying state ST5. The communication device 100 reports the capability to the network. If the communication device 100 leaves the connected mode, the communication device 100 leaves all of the states in the FIG. 7; if the communication device 100 detects the serving RAT is changed, the communication device 100 enters a severing RAT changing state ST6. In the severing RAT changing state ST6, the communication device 100 sends indication to the network to inform update of the capability. If the network quires the communication device 100 new capability, the communication device 100 backs to the capability composing state ST1.

According to the embodiments described above, the distribution of the capability report message could be dynamically changed based on which one of the RATs is the serving RAT. More band combinations for the serving RAT are able to be reported and therefore the network could successfully configure such service to the communication device 100.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A capability reporting method for a wireless communication device, comprising:

receiving a capability enquiry message from a network;

determining a plurality of weightings for a serving Radio Access Technology (RAT) and at least one non-serving RAT, wherein the weighting for the at least one non-serving RAT is downgraded;

composing a plurality of capability information for the serving RAT and the at least one non-serving RAT according to the weightings, wherein size of the capability information for the at least one non-serving RAT is reduced;

combining the capability information for the serving RAT and the capability information for the at least one non-serving RAT to obtain a capability report message; and replying the capability report message to the network;

wherein if the serving RAT for the wireless communication device is changed, determining the weightings according to the serving RAT and the at least one non-serving RAT is performed again to update the weightings.

2. The capability reporting method for the wireless communication device according to claim 1, wherein the capability information for the serving RAT occupies major size of the capability report message.

3. The capability reporting method for the wireless communication device according to claim 1, wherein a size of the capability information for the serving RAT is larger than or equal to the size of the capability information for the at least one non-serving RAT.

4. The capability reporting method for the wireless communication device according to claim 1, wherein if the serving RAT for the wireless communication device is changed from Long-Term Evolution (LTE) to New Radio (NR), a size of the capability information for LTE is decreased and a size of the capability information for NR is increased.

5. The capability reporting method for the wireless communication device according to claim 1, wherein if the serving RAT for the wireless communication device is changed from New Radio (NR) to Long-Term Evolution (LTE), a size of the capability information for LTE is increased and a size of the capability information for NR is decreased.

6. The capability reporting method for the wireless communication device according to claim 1, wherein only part of a plurality band combinations for the at least one non-serving RAT are recorded in the capability report message.

7. A capability reporting method for a wireless communication device, comprising: receiving a capability enquiry message from a network;

determining a plurality of weightings for a serving Radio Access Technology (RAT) and at least one non-serving RAT, wherein the weighting for the at least one non-serving RAT is downgraded;

composing a plurality of capability information for the serving RAT and the at least one non-serving RAT according to the weightings, wherein size of the capability information for the at least one non-serving RAT is reduced;

obtaining a capability message report from the serving RAT and the at least one non-serving RAT to obtain a capability report message; and replying the capability report message with dynamic distribution for the serving Radio Access Technology (RAT) and the at least one non-serving RAT to the network;

wherein if the serving RAT for the wireless communication device is changed, a distribution of the capability report message for the serving RAT and the at least one non-serving RAT is changed.

8. The capability reporting method for the wireless communication device according to claim 7, wherein a capability information for the serving RAT occupies major size of the capability report message.

9. The capability reporting method for the wireless communication device according to claim 7, wherein a size of the capability information for the serving RAT is larger than or equal to a size of the capability information for the at least one non-serving RAT.

10. The capability reporting method for the wireless communication device according to claim 7, wherein if the serving RAT for the wireless communication device is changed from Long-Term Evolution (LTE) to New Radio (NR), a size of the capability information for LTE is decreased and a size of the capability information for NR is increased.

11. The capability reporting method for the wireless communication device according to claim 7, wherein if the serving RAT for the wireless communication device is changed from New Radio (NR) to Long-Term Evolution (LTE), a size of the capability information for LTE is increased and a size of the capability information for NR is decreased.

12. The capability reporting method for the wireless communication device according to claim 7, wherein only part of a plurality band combinations for the at least one non-serving RAT are recorded in the capability report message.

13. A modem chip in a wireless communication device, wherein the modem chip is configured to execute a capability reporting method, comprising:

receiving a capability enquiry message from a network;

determining a plurality of weightings for a serving Radio Access Technology (RAT) and at least one non-serving RAT, wherein the weighting for the at least one non-serving RAT is downgraded;

composing a plurality of capability information for the serving RAT and the at least one non-serving RAT according to the weightings, wherein size of the capability information for the at least one non-serving RAT is reduced;

obtaining a capability message report from the serving RAT and the at least one non-serving RAT to obtain a capability report message; and replying the capability report message with dynamic distribution for the serving Radio Access Technology (RAT) and the at least one non-serving RAT to the network;

wherein if the serving RAT for the wireless communication device is changed, a distribution of the capability report message for the serving RAT and the at least one non-serving RAT is changed.

14. The modem chip in the wireless communication device according to claim 13, wherein a capability information for the serving RAT occupies major size of the capability report message.

15. The modem chip in the wireless communication device according to claim 13, wherein a size of the capability information for the serving RAT is larger than or equal to a size of the capability information for the at least one non-serving RAT.

16. The modem chip in the wireless communication device according to claim 13, wherein if the serving RAT for the wireless communication device is changed from Long-Term Evolution (LTE) to New Radio (NR), a size of the capability information for LTE is decreased and a size of the capability information for NR is increased.

17. The modem chip in the wireless communication device according to claim 13, wherein if the serving RAT for the wireless communication device is changed from New Radio (NR) to Long-Term Evolution (LTE), a size of the capability information for LTE is increased and a size of the capability information for NR is decreased.

* * * * *